(12) United States Patent
Patel

(10) Patent No.: US 7,558,957 B2
(45) Date of Patent: Jul. 7, 2009

(54) PROVIDING FRESH SESSION KEYS

(75) Inventor: Sarvar Patel, Montville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 834 days.

(21) Appl. No.: 11/108,610

(22) Filed: Apr. 18, 2005

(65) Prior Publication Data

US 2006/0236106 A1    Oct. 19, 2006

(51) Int. Cl.
*H04L 9/00* (2006.01)
(52) U.S. Cl. ...................................... 713/169
(58) Field of Classification Search ................. 713/169, 713/150, 171; 380/255, 270, 278
See application file for complete search history.

(56) References Cited

U.S. PATENT DOCUMENTS

| | | | | |
|---|---|---|---|---|
| 5,534,857 A | 7/1996 | Laing et al. | ............ | 340/825.33 |
| 2003/0093663 A1 | 5/2003 | Walker | ....................... | 713/150 |

2006/0205388 A1* 9/2006 Semple et al. .............. 455/411

FOREIGN PATENT DOCUMENTS

WO    WO 2004034213 A2    4/2004

OTHER PUBLICATIONS

International PCT Search Report PCT/US2006/013283 dated Aug. 11, 2006.
"Universal Mobile Telecommunications System (UMTS); Generic Authentication Architecture (GAA); Generic Boostrapping Architecture" 3GPP TS 33.220 version 6.3.0 Release Dec. 6, 2004.

* cited by examiner

*Primary Examiner*—Kambiz Zand
*Assistant Examiner*—Ali S Abyaneh

(57) ABSTRACT

The present invention provides a method of key material generation in which the key material is used to authenticate communication for user equipment and at least one network application function. The method includes providing a bootstrapping identifier associated with first key material and a first random number, receiving information indicative of a second random number, and forming second key material based upon the first key material, the first random number, and the second random number.

15 Claims, 4 Drawing Sheets

PROVIDING FRESH SESSION KEYS

BACKGROUND OF THE INVENTION

1. Field of the Invention

This invention relates generally to communication systems, and, more particularly, to wireless communication systems.

2. Description of the Related Art

Conventional wireless communication systems use various authentication techniques to protect the security and/or integrity of information transmitted through the system. For example, an Authentication and Key Agreement (AKA) protocol has been implemented in the Third Generation Partnership Project (3GPP) authentication infrastructure. The 3GPP AKA protocol may be leveraged to enable application functions in the network and/or on the user side to establish shared keys using a bootstrapping technique.

FIG. 1 conceptually illustrates a conventional model of a bootstrapping architecture 100 that is based on the 3GPP AKA protocol. The bootstrapping architecture 100 includes a Home Subscriber Server (HSS) that is coupled to a Bootstrapping Server Function (BSF) by an interface Zh. The BSF is coupled to one or more User Equipment (UE, also commonly referred to as mobile units) by an interface Ub. The BSF is also connected to a Network Application Function (NAF) by an interface Zn. The NAF is coupled to the UE by an interface Ua. The entities included in the bootstrapping architecture 100 are described in detail in the 3GPP Technical Specification 3GPP TS 33.220 V6.3.0 (2004-12), which is hereby incorporated herein by reference in its entirety. The 3GPP Technical Specification 3GPP TS 33.220 V6.3.0 (2004-12) will be referred to hereinafter as the 3GPP Technical Specification.

FIG. 2 conceptually illustrates a conventional bootstrapping procedure 200. The UE may initiate the bootstrapping procedure 200 by sending a request towards the BSF, as indicated by arrow 205. The BSF may retrieve user security settings and/or authentication data, such as an Authentication Vector, from the HSS, as indicated by double arrow 210. The BSF sends an authentication request (indicated by the arrow 215) to the UE. The authentication request 215 may be formed based upon the user security settings and/or authentication data retrieved from the HSS. The authentication request 215 may include random numbers and/or authentication tokens that may be used in the authentication process. The UE performs (at 220) Authentication and Key Agreement procedures to verify that the authentication request is from an authorized network. The UE may also calculate various session keys and/or a digest AKA response.

The digest AKA response is sent to the BSF (as indicated by the arrow 225), which may authenticate (at 230) the UE based upon the digest AKA response. The BSF may then generate (at 230) one or more keys (Ks), as well as one or more lifetimes of the keys. A confirmation message including the keys and, if available, the key lifetimes may be sent to the UE, as indicated by the arrow 235. In response to receiving the confirmation message, the UE may generate (at 240) one or more keys (Ks), which should correspond to the one more keys (Ks) generated by the BSF. The UE and the BSF may use the keys (Ks) to generate key material Ks_NAF that may be used for communication between the UE and an NAF.

FIG. 3 conceptually illustrates a conventional method 300 of forming a secure communication link between a UE and an NAF. The UE derives (at 305) key material Ks_NAF using the key (Ks) and then transmits an application request to the NAF, as indicated by the arrow 310. The application request 310 typically includes a bootstrapping transaction identifier (B-TID), as well as other information. The NAF transmits an authentication request to the BSF, as indicated by the arrow 315. The authentication request 315 includes the B-TID and a NAF host name. The BSF provides an authentication answer, as indicated by the arrow 320. The authentication answer 320 typically includes key material Ks_NAF derived from the key (Ks), as well as any appropriate key lifetimes. The key material Ks_NAF is stored (at 325) by the NAF and an application answer is provided to the UE, as indicated by arrow 330. Once the method 300 of forming the secure communication link is complete, the UE and the NAF may communicate securely through the interface Ua shown in FIG. 1.

Conventional bootstrapping procedures, such as the 3GPP GBA architecture described above, are not typically able to create fresh key material associated with a NAF (Ks_NAF) unless the key material (Ks) is changed or updated. This may expose the system to security risks and/or decrease the efficiency of the system. For example, if a NAF does not incorporate replay protection, then inadvertent reuse of the same Ks_NAF may expose the NAF to a replay attack. The NAF can specify that each time a Ks_NAF is requested then the corresponding key material (Ks) should also be updated, but this requires the designer of the service to be security aware. In practice, designers may be unaware of the security risk or they may not have the time or expertise to modify the NAF to prevent replay attacks by regularly updating the key material (Ks). Furthermore, replay protection or fresh Ks_NAF may not be necessary when the system is first deployed, but over time the use of the NAF may evolve such that replay attacks become a concern. The designer of the NAF may decide to err on the side of safety and specify that whenever the NAF requests Ks_NAF, the UE should update the key material (Ks). Although this approach may increase security, it may also reduce the efficiency of the system. For example, the HSS may have to be contacted repeatedly to update the key material (Ks), which may increase traffic to legacy authentication systems. Repeated interaction with the HSS may also increase the time that a UE waits for the service provided by NAF to begin.

The GBA architecture specified in the 3GPP Technical Specification may or may not allow parallel independent sessions between the same pair of UE and NAF. In particular, the 3GPP Technical Specification does not provide clear guidelines for providing key material to parallel sessions. For example, the 3GPP Technical Specification specifies that the UE may store at most one Ks_NAF key per NAF_Id. The 3GPP Technical Specification also states that only the corresponding Ks_NAF is updated when the UE and NAF agree on new key material (Ks). All other Ks_NAF relating to other NAF_Ids stored in the UE should not be affected.

The ambiguity of the 3GPP Technical Specification leaves important questions unresolved. For example, a NAF may specify that a key material (Ks) update will be requested for every session (e.g., because the NAF does not have replay protection). When a first session is established between the UE and the NAF, the key material (Ks) may be updated and a session key (Ks_NAF) may be stored on the UE. If a second parallel session is established concurrently with the first session, the key material (Ks) may again be updated and a new session key may be formed. The 3GPP Technical Specification does not, however, specify which of the session keys should be stored in the UE.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later. The present invention is directed to addressing the effects of one or more of the problems set forth hereinabove.

In one embodiment of the present invention, a method is provided for key material generation in which the key material is used to authenticate communication for user equipment and at least one network application function. The method may include providing a bootstrapping identifier associated with first key material and a first random number, receiving information indicative of a second random number, and forming second key material based upon the first key material, the first random number, and the second random number.

In another embodiment of the present invention, a method is provided for key material generation in which the key material is used to authenticate communication for user equipment and at least one network application function. The method may include receiving a bootstrapping identifier associated with first key material and a first random number, determining a second random number, providing the bootstrapping identifier associated with the first key material and the first and second random numbers, and receiving second key material formed using the bootstrapping identifier associated with the first key material and the first and second random numbers.

In yet another embodiment of the present invention, a method is provided for key material generation in which the key material is used to authenticate communication for user equipment and at least one network application function. The method may include receiving a bootstrapping identifier associated with first key material and first and second random numbers, determining the first key material based upon the bootstrapping identifier associated with the first key material, and forming second key material based upon the first key material and the first and second random numbers.

BRIEF DESCRIPTION OF THE DRAWINGS

The invention may be understood by reference to the following description taken in conjunction with the accompanying drawings, in which like reference numerals identify like elements, and in which.

Figure 1:
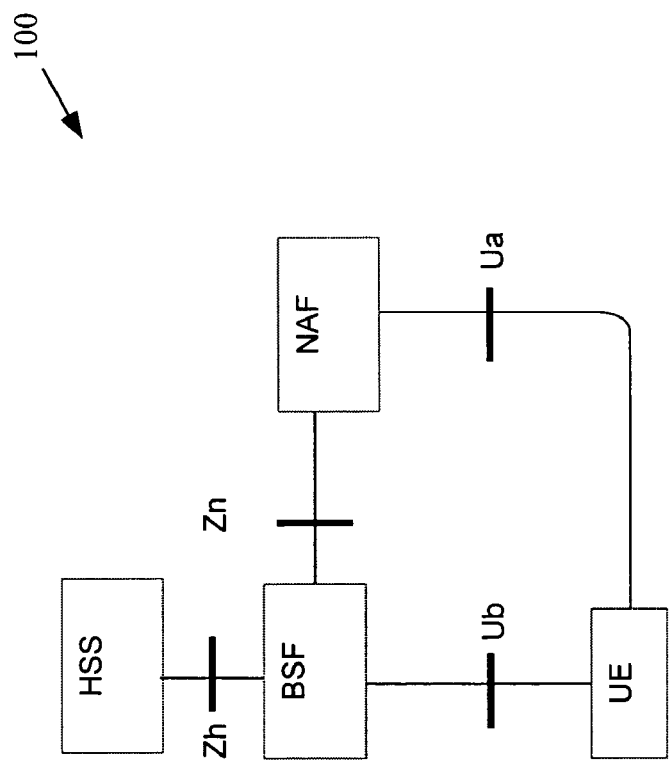
FIG. 1 conceptually illustrates a conventional model of a bootstrapping architecture that is based on the 3GPP AKA protocol.
Figure 2:
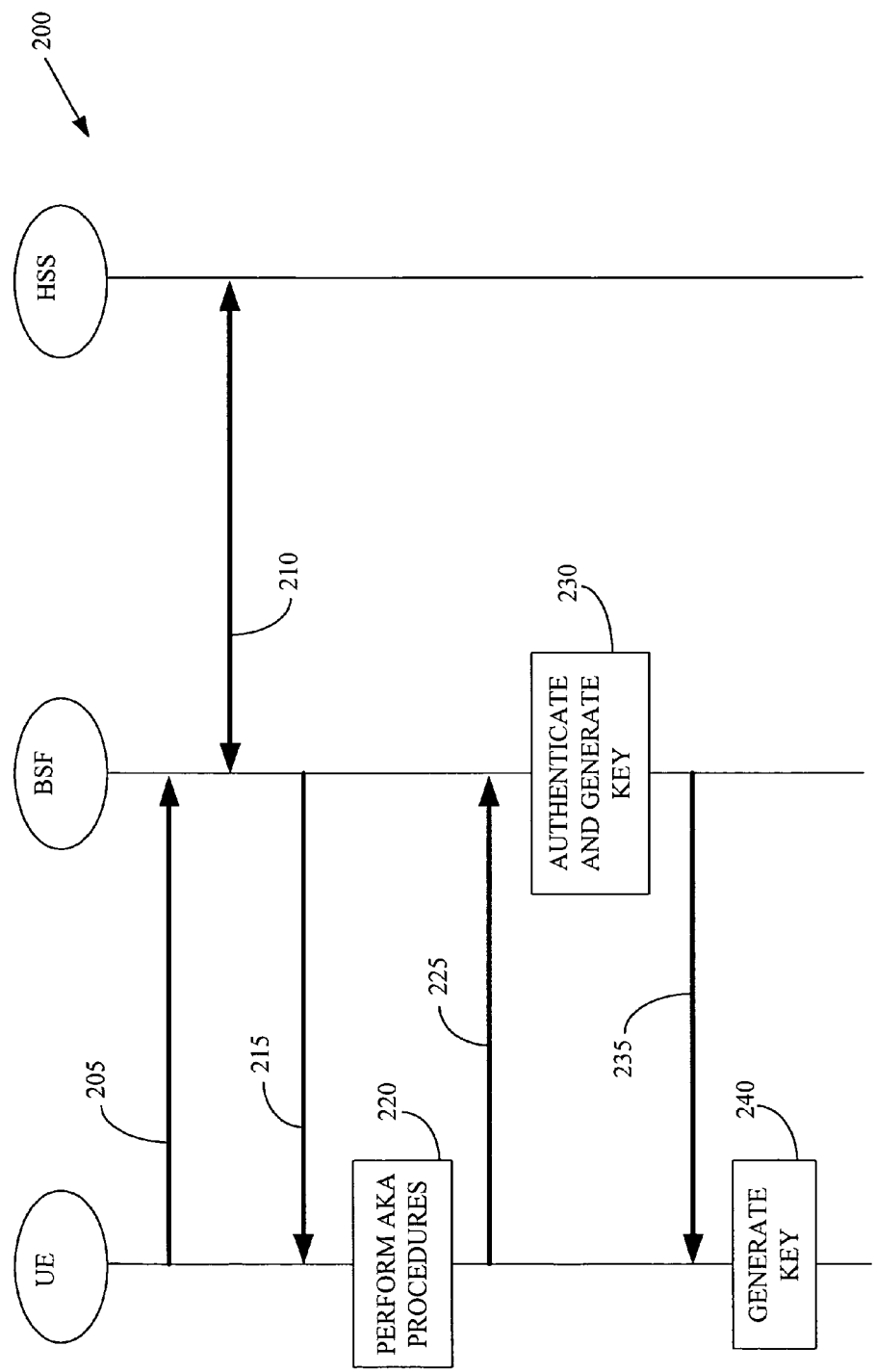
FIG. 2 conceptually illustrates a conventional bootstrapping procedure.
Figure 3:
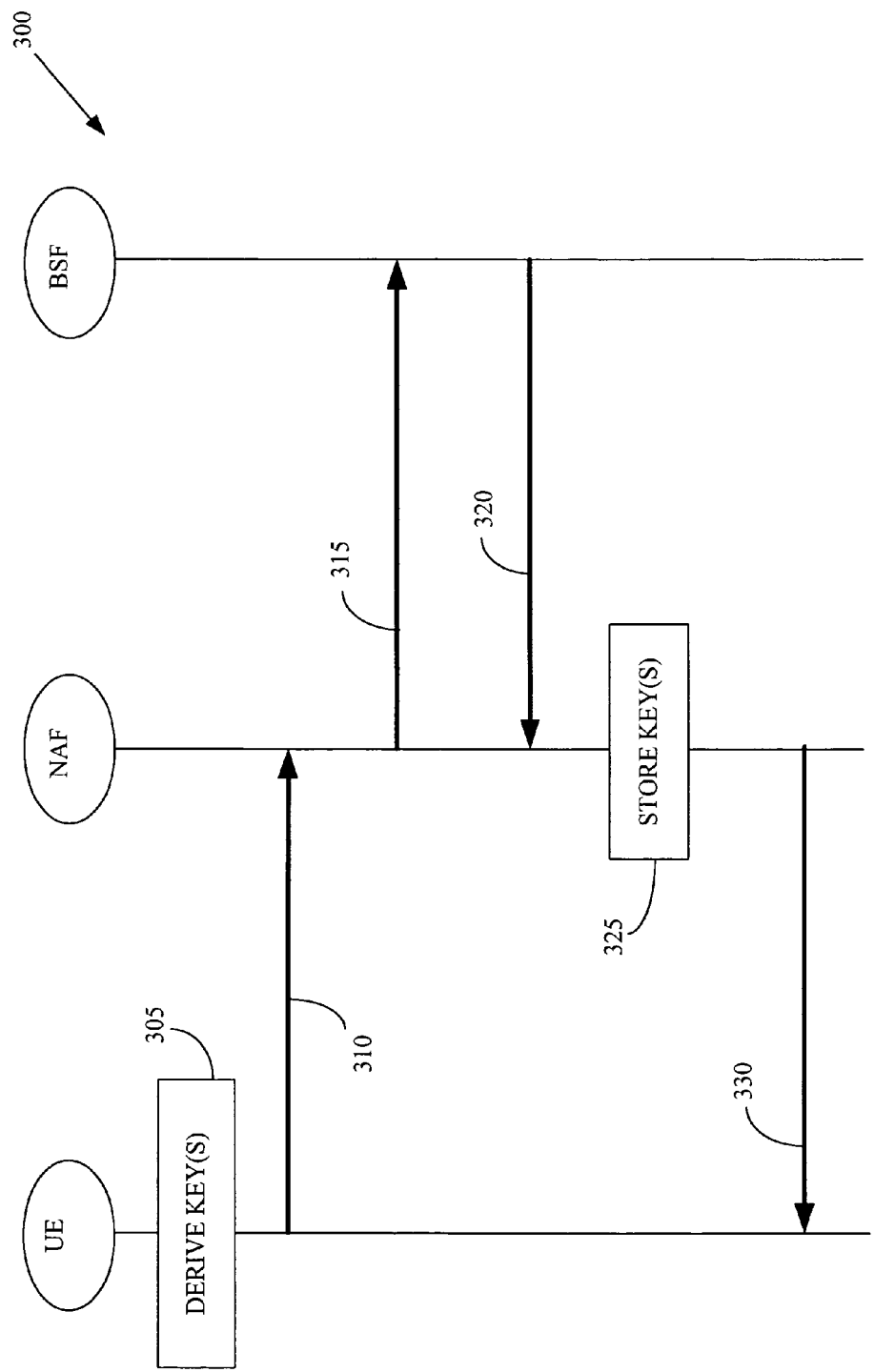
FIG. 3 conceptually illustrates a conventional method of forming a secure communication link between a UE and an NAF.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 4:
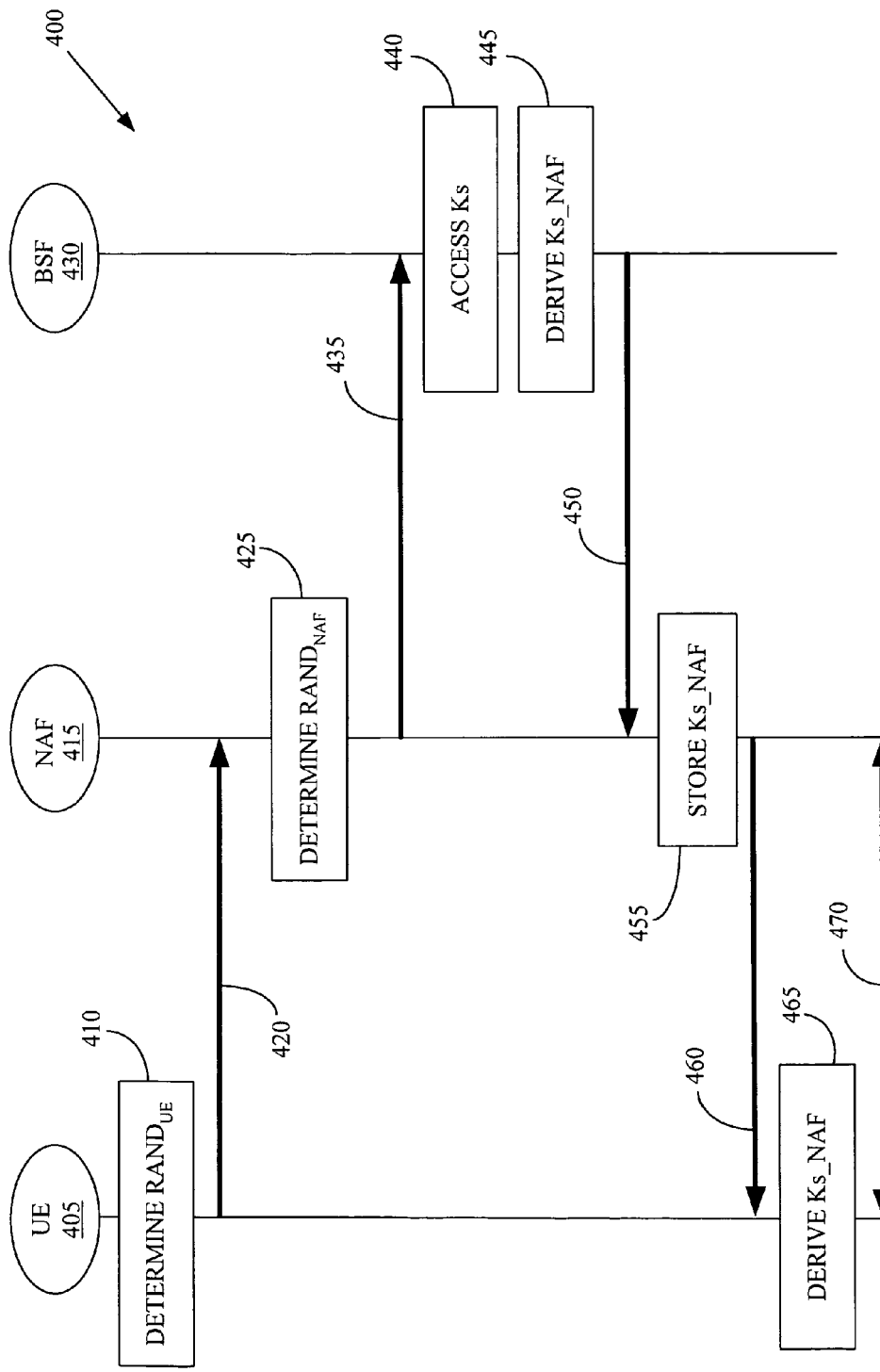
FIG. 4 conceptually illustrates one exemplary embodiment of a method for providing fresh session keys, in accordance with the present invention.

FIG. 4 conceptually illustrates one exemplary embodiment of a method 400 for providing fresh session keys. In the illustrated embodiment, user equipment 405 determines (at 410) a random number. For example, the user equipment 405 may determine (at 410) a 128-bit string representing a random number ($RAND_{UE}$). The user equipment 405, which may also be referred to as a mobile unit, may include cellular telephones, personal data assistants, smart phones, text messaging devices, laptop computers, and the like. The user equipment 405 then provides an application request message to a network application function 415, as indicated by arrow 420. The application request message 420 may be used to establish a new session or to refresh an old session with the network application function 415. In one embodiment, the application request message 420 includes the random number and a bootstrapping identifier (B-TID). For example, the application request message 420 may include the 128-bit string representing the random number ($RAND_{UE}$) and a bootstrapping identifier that is associated with key material (Ks). The key material (Ks) may have been previously agreed upon in a mutual authentication procedure, such as an authentication procedure performed according to a Generic Bootstrapping Architecture.

The network application function 415 receives the application request message 420 and determines (at 425) another random number. For example, the network application function 415 may determine a 128-bit string representing a random number ($RAND_{NAF}$) in response to receiving the application request message 420. The network application function 415 then provides a key request message to a bootstrapping server function 430, as indicated by arrow 435. In one embodiment, the key request message 435 includes the bootstrapping identifier and the random numbers ($RAND_{UE}$, $RAND_{NAF}$) generated by the user equipment 405 and the network application function 415.

The bootstrapping server function 430 uses the bootstrapping identifier provided by the network application function 415 to access (at 440) key material associated with the user equipment 405 and/or the network application function 415. The bootstrapping server function 430 forms (at 445) a session key using information indicative of the key material (Ks), such as the bootstrapping identifier, and the random numbers ($RAND_{UE}$, $RAND_{NAF}$) generated by the user equipment 405 and the network application function 415. For example, the bootstrapping server function 430 may form (at 445) the session key (Ks_NAFi) using a key derivation function (KDF), so that Ks_NAFi=KDF(Ks, $RAND_{UE}$, $RAND_{NAF}$), where the index i (also referred to herein as an identifier) signifies the session number that is used to identify the session key. In one embodiment, the index i is given by a concatenation of the random numbers ($RAND_{UE}$, $RAND_{NAF}$). The session key (Ks_NAFi) is then provided to the network application function 415, as indicated by arrow 450. In one embodiment, the bootstrapping server function 430 may also determine a key expiration time and provide the key expiration time to the network application function 415. Persons of ordinary skill in the art should appreciate that the key digest function may use other information, such as an address of a network application function (NAF_Id), to derive the session key (Ks_NAFi).

The network application function 415 receives the session key (Ks_NAFi) and stores (at 455) the session key (Ks_NAFi). The network application function 415 also provides information indicative of the random numbers ($RAND_{NAF}$) generated by the network application function 415 to the user equipment 405, as indicated by arrow 460. The user equipment 405 forms (at 465) a session key using information indicative of the key material (Ks), such as the bootstrapping identifier, and the random numbers ($RAND_{UE}$, $RAND_{NAF}$). For example, the user equipment 405 may form (at 465) the session key (Ks_NAFi) using a key derivation function (KDF), so that Ks_NAFi=KDF(Ks, NAF_Id, $RAND_{UE}$, $RAND_{NAF}$). The session keys derived (at 445 and 465) by the bootstrapping server function 430 and the user equipment 405 should correspond and so can be used to authenticate the user equipment 405 and the network application function 415. Accordingly, the user equipment 405 and the network application function 415 can form a secure connection, as indicated by arrow 470.

In one embodiment, a new session key (Ks_NAFi) may be created each time the user equipment 405 and the network application function 415 establish a new session, e.g., using the 3GPP2 GBA mechanism. Both the user equipment 405 and the network application function 415 can contribute random numbers ($RAND_{UE}$, $RAND_{NAF}$) that may be used to calculate the fresh session key. Accordingly, the network application function 415 does not have to provide its own replay protection or worry whether it should request an update of the key material (Ks). Since the session key may be fresh, the network application function 415 can use it directly. No new delay is added because messages defined in the 3GPP Technical Specification are used. Thus, fresh session keys can be provided without requiring updating of the key material (Ks). Reducing the number of times that the key material (Ks) needs to be updated may also improve the efficiency of the communication system. Some ambiguities of the 3GPP Technical Specification may also be clarified by implementing one or more of the embodiments, discussed herein. For example, providing fresh session keys identified by a unique identifier may resolve the ambiguities regarding which session key should be stored if parallel sessions are established. In one embodiment, the session keys associated with each parallel session, and identified by the identifier, would be stored.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of key material generation implemented in user equipment and used for authenticating communication between the user equipment and a network application function, the method comprising:

providing, from said user equipment to the network application function, a bootstrapping identifier associated with first key material and a first random number;

receiving, at said user equipment from the network application function information indicative of a second random number; and forming second key material based upon the first key material, the first random number, and the second random number, the second key material corresponding to third key material generated by a bootstrapping server and stored in the network application function.

2. The method of claim 1, comprising determining the first random number.

3. The method of claim 2, wherein determining the first random number comprises determining a first 128-bit random number.

4. The method of claim 1, wherein receiving information indicative of the second random number comprises receiving the information indicative of the second random number in response to providing the information indicative of the first key material and the first random number to the network application function.

5. The method of claim 1, comprising establishing a secure connection between said user equipment and the network application function using the second key material and the third key material stored in the network application function.

6. The method of claim 1, comprising recalculating the second key material, the first key material, a new first random number generated by said user equipment, and a new second random number generated by the network application function, wherein the second key material is recalculated each time a new session is created between user equipment and the network application function.

7. A method of key material generation implemented in a network application function and used for authenticating communication between the network application function and user equipment, the method comprising:

receiving, at the network application function from the user equipment, a bootstrapping identifier associated with first key material and a first random number generated by the user equipment;

determining, at the network application function, a second random number;

providing the bootstrapping identifier associated with the first key material and the first and second random numbers to a bootstrapping server; and receiving, at the network application from the bootstrapping server, second key material formed by the bootstrapping server using the bootstrapping identifier associated with the first key material and the first and second random numbers.

8. The method of claim 7, wherein determining the second random number comprises determining a second 128-bit random number.

9. The method of claim 7, wherein determining the second random number comprises determining the second random number in response to receiving the information indicative of the first key material and the first random number from the user equipment.

10. The method of claim 7, comprising providing the second random number to said user equipment.

11. The method of claim 7, comprising establishing a secure connection between the user equipment and the network application function using the second key material and third key material generated by the user equipment using the first key material, the first random number, and a second random number.

12. A method of key material generation implemented in a bootstrapping server and used for authenticating communication between user equipment and a network application function, the method comprising:

receiving, at the bootstrapping server from the network application function a bootstrapping identifier associated with first key material and first and second random numbers generated by the user equipment and the network application function, respectively;

accessing, at the bootstrapping server, the first key material based upon the bootstrapping identifier associated with the first key material; and forming, at the bootstrapping server, second key material based upon the first key material and the first and second random numbers.

13. The method of claim 12, comprising providing the second random number to the network application function.

14. The method of claim 12, comprising providing the second key material to the network application function.

15. The method of claim 12, comprising associating the second key material with at least one identifier.

* * * * *